United States Patent [19]

Lau

[11] Patent Number: 4,675,220
[45] Date of Patent: Jun. 23, 1987

[54] DAMPENER ROLL COVER
[75] Inventor: Wing Y. T. Lau, Seneca, S.C.
[73] Assignee: The Kendall Company, Boston, Mass.
[21] Appl. No.: 913,891
[22] Filed: Oct. 1, 1986
[51] Int. Cl.$^4$ .............................................. B32B 7/00
[52] U.S. Cl. ...................................... 428/36; 428/253; 428/374; 428/906; 428/913
[58] Field of Search ................. 428/36, 253, 254, 906, 428/374, 913

[56] References Cited
U.S. PATENT DOCUMENTS
4,325,998 4/1982 Chapman .............................. 428/36

Primary Examiner—Marion C. McCamish
Attorney, Agent, or Firm—Francis J. Clark

[57] ABSTRACT

An improved fabric for covering dampener rolls comprising a ground yarn utilizing a water shrinkable yarn and a hydrophilic yarn knitted together in the same course of the fabric. The fabric is fashioned into a cylindrical tube and is securely fastened to a roll by thoroughly wetting the tubular fabric and roll in water until the water shrinkable yarn shrinks causing the fabric to tighten down on the roll. When the water shrinkable portion of the ground yarn in the dampener cover shrinks, it does so in a widthwise or circumferential manner, thereby exerting a force upon the surface of the dampener roll, thus securing the dampener cover to the dampener roll. This unique fabric construction permits the hydrophilic yarn to be drawn close together as the water shrinkable yarn shrinks, permitting the fabric to have a substantially smooth surface, thus eliminating patterning of a product made thereby.

7 Claims, 4 Drawing Figures

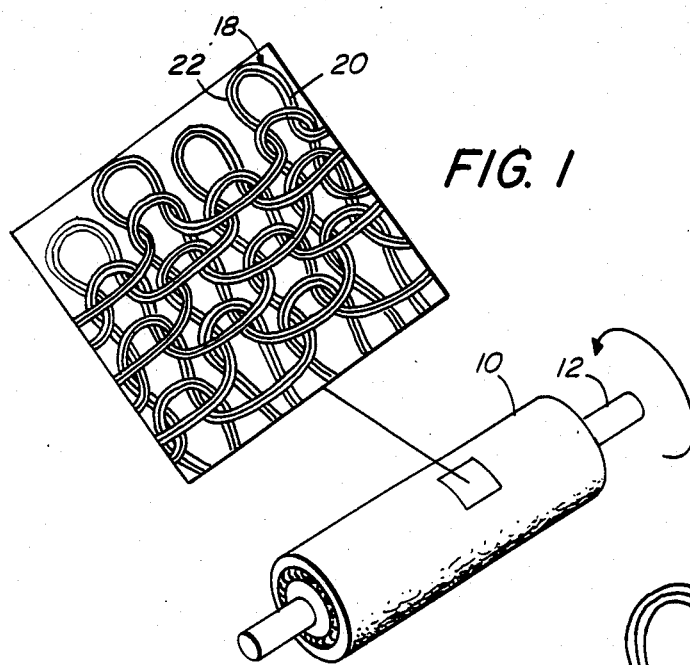
FIG. 1
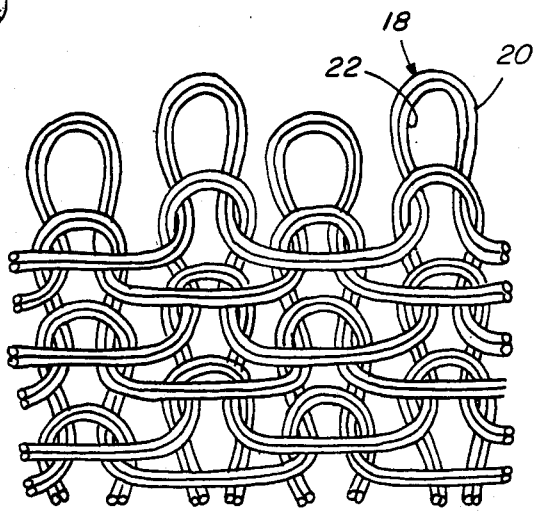
FIG. 2
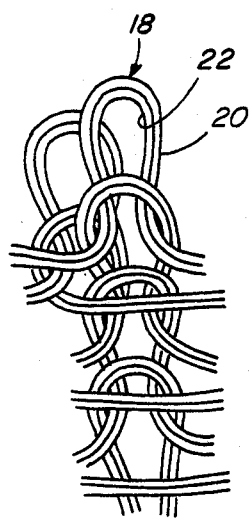
FIG. 3
|  | X |  | X | 2ND COURSE |
| X |  | X |  | 1ST COURSE |
FIG. 4

DAMPENER ROLL COVER

BACKGROUND OF INVENTION

1. Field of Invention

This invention relates to an improved cylindrical dampener cover used on an offset printing machine for supplying water to a plate cylinder. More particularly, the invention relates to a dampener roll cover for use in an offset printing machine prepared by knitting or weaving a water shrinkable yarn and a hydophillic yarn as ground yarns in the same course into a cover.

2. Prior Art

Prior art dampener roll covers used to supply water to the plate cylinder were prepared by fabricating a cloth made by knitting or weaving cotton into a cylindrical shape, mounting it onto a dampener roll, and stretching it by pulling the opposite ends of the cylindrically shaped cloth before use. Difficulties are encountered in this technique because the covering fabric is apt to be loosened by centrifugal force during the rotation of the roll, causing the supply of water to the plate cylinder to become uneven due to uneven gathering of the fabric, or cause patterning of the fabric to take place. Patterning of a fabric may be defined as the imprinting of the dampener roll cover surface onto a fabric. Patterning is caused when pressure is exerted on the dampener roll so as to bring the cover on the roll into contact with the fabric. This leaves an impression characteristic of the knit construction of the dampener roll cover on the fabric, causing frequent interruptions of the printing operation in order to replace the covering fabric with a new cover or to try to restretch the old one. This eventually results in a reduction of the efficiency of the printing operation, adding additional costs of material and labor.

In U.S. Pat. No. 3,242,554, it is disclosed that dampener roll covers can be made from water-shrinkable fabrics. These fabrics are made into a cylindrical cover, mounted on a dampener roll and immersed in water to shrink the cover on the roll. However, these particular water-shrinkable fabrics must first be wet-stretched and dried prior to use. They have a limited degree of stretch, and then shrink by less than the original stretching when wet. This particular covering has drawbacks, because with the shrinkage, the surface of the cover becomes uneven and is not smooth, thus causing a patterning of the fabric.

Additionally, U.S. Pat. No. 3,926,701 discloses a covering fabric for a dampener roll, which is comprised of yarn capable of shrinking by the action of water. However, the shrinkable yarns used therein are employed as the ground yarn of the covering with hydrophilic yarns used as the pile yarn. In mounting the covering fabric of this invention onto a dampener roll, the roll covered with the fabric is immersed in water, often warm water, and the ground yarns of the covering fabric shrinks to closely fit the covering fabric to the dampener roll. This causes the pile yarn to gather together to form an uneven surface on the fabric. This uneven surface causes patterning on a fabric. In addition, because shrinkage occurs on the dampener cover in the lengthwise direction, when mounting, sufficient fabric must be used in order to accommodate the lengthwise shrinkage of the dampener cover to cover the dampener roll.

It is therefore difficult, if not impossible, to be able to calculate the correct length of the covering fabric that should be used. Thus, one must use an excess of material to insure an adequate fit. Furthermore there is a loss that arises with respect to the material and man hours that may be lost due to the material that may have to be removed after shrinkage of the covered fabric to the dampener roll.

The present invention has succeeded where others have failed in obtaining an excellent covering fabric for a dampener roll without the drawbacks encountered with either the conventional structured covers or by the prior art water-shrinkable covers.

An object of this invention is to provide a cover fabric that will eliminate the patterning of a product by a dampener roll cover.

Another object of this invention is to provide a covering fabric that has superior circumferential shrinkage and gripping action on the surface of a dampener roll.

SUMMARY OF THE INVENTION

The present invention is an improved fabric for covering dampener rolls comprising a ground yarn of a water shrinkable yarn and a hydrophilic yarn. The water shrinkable yarn and the hydrophilic Yarn are positioned adjacent to each other so as to facilitate knitting both together in the same course of the fabric. The fabric is fashioned into a cylindrical tube and is securely fastened to a roll by submerging the fabric and roll in water until the water shrinkable yarn shrinks causing the fabric to tighten down on the roll. This unique assemblage of yarns results in the cover exerting a circumferential gripping action on the dampener roll thus securing itself better than other prior art dampener covers. This assemblage of yarns, as the water-shrinkable yarns shrink, also permit the hydrophilic yarn to be drawn close together to form a substantially smooth surface on the cover fabric, thus eliminating patterning of a product made thereby. The assemblage of yarns also accounts for a reduction in the amount of fabric needed to cover a roll.

BRIEF DESCRIPTION OF THE DRAWINGS

The objects and advantages of the present invention will become more apparent when viewed in conjunction with the following drawings, in which:

FIG. 1 shows a dampener roll with a cover made in accordance with the present invention.

FIG. 2 shows the water shrinkable yarn and the hydrophilic yarn of the fabric knitted in the same course of the present invention, before being wet.

FIG. 3 shows the fabric of the present invention after being wet.

FIG. 4 illustrates the first and second course of the fabric cover in diagram form.

DESCRIPTION OF THE PREFERRED EMBODIMENT

The present invention provides a cover for a dampener roll prepared by circular weft knitting a water-shrinkable yarn, and a hydrophilic yarn as the ground yarn into a fabric.

The invention is knitted on a very fine needle gauge circular knitting machine, in a knit-float construction, with at least 28 needles per inch. As shown in FIGS. 2, 3 and 4, the first and second knit courses are of a knit-float construction with the second knit being a knit-float construction of alternate needles. This knit construction permits the fabric to have excellent circumferential shrinkage, (up to 35%) with the use of a shrinkable PVA yarn. The present invention cover may be knitted on a circular knit machine with 32 needles per inch. This results in a fabric having at least 35 wales per inch. It is preferable to have 40 to 45 wales per inch. The fabric should have at least 50 courses per inch, with 55 courses per inch being preferred. In the present invention fabric, as the water-shrinkable yarn shrinks, it draws the ground yarns close together, resulting in the hydrophilic yarn forming a fine textured surface on the fabric. This fine or smooth surface on the cover fabric virtually eliminates the aforementioned patterning problem associated with prior art fabrics.

Although not used in the present invention a third yarn such as a nylon which has a high tensile strength may also be added to the fabric such that all three yarns are knitted together in the same course of the fabric. The high tensile yarn increases the strength and durability of the fabric. Although nylon yarn is preferred, any high tensile yarn may be used.

FIG. 1 having an insert, shows the cover 10 mounted on a dampener roll 12, and also shows the circumferential direction of the yarns. The yarns used in the making of this product consist of ground yarns 18, of a water shrinkable yarn 20 and a hydrophilic yarn 22 knit together in the same course within the fabric, as shown in FIG. 2. The hydrophilic yarn 22 of the cylindrical cover 10 may be selected from one or more hydrophilic yarns, for example, cotton, hemp, wool, silk, rayon and nylon or the like.

FIGS. 2 and 3 illustrates the above wherein a polyvinyl alcohol (PVA) multi-filament yarn 20 made from a polyvinyl alcohol resin, such as that made by the Nitivy Company, having the capability of shrinking in water is used in conjunction with a nylon yarn.

FIGS. 2 and 3 also illustrate the reaction caused by submerging the dampener roll into water. FIG. 2 shows a section of the dampener roll cover before it is submerged in water with the water shrinkable yarn 20 lying in a relaxed state. FIG. 3 shows the same section as illustrated in FIG. 2 but after it has been submerged in water and the water shrinkable yarn 20 has reacted by shrinking in a widthwise direction causing the dampener cover to be reduced in circumference.

The procedure in assembling the cover on the dampener roll requires the cover to be positioned on the dampener roll, then the roll with the covering fabric thereon is immersed in water, usually warm water because the reaction of the yarn is greater under these conditions. The water shrinkable yarn of the covering fabric will then shrink in a widthwise or circumferential direction to fix the cover to the roll.

Because the shrinkage occurs predominantly in the widthwise or circumferential direction, it is not necessary to add additional length of fabric to the cover prior to mounting on the dampener roll in order to compensate for shrinkage in the lengthwise direction, such as is exhibited by prior art covers. Therefore, since more precise measurements can be used in making the cover, significant savings in raw material costs are possible. It has been unexpectedly found that there are advantages in using a shrinkable yarn and a hydrophilic yarn knitted together in the same course. One such advantage is, as the water shrinkable yarn shrinks as shown in FIG. 3, the hydrophilic yarn is drawn close together so as to form a smooth surface on the finished cover, thus enhancing the quality of printing, by eliminating the patterning problem. Another advantage is that the fabric construction results in a thicker fabric than that produced by the prior art. Thus the present invention has higher moisture retaining properties. Still another advantage is that the knit-float construction permits the dampener roll cover to shrink more than the prior art, gripping the roll more securely than prior art.

Additionally, the cover may be cut to a predetermined length to fit a dampener roll. When shrinkage occurs the cover will shrink not only to fit the fabric onto the surface of the roll but the fabric will shrink at the ends of the roll to permit necking in around the edge of the roll take place, further securing the cover in position on the roll.

To realize the aforementioned advantages the shrinkable yarns used are usually yarns of polyvinyl alcohol which generally have a shrinkage percentage between 25-40%. Although PVA yarns are preferred, other yarns which have typically high shrinkage may be used with similar although somewhat less desirable results; for example, polyester, nylon, rayon.

The following are examples illustrative of a preferred embodiment and a modification of the preferred embodiment. These examples should not limit the present invention.

EXAMPLE 1

A cylindrical fabric was prepared by knitting polyvinyl alcohol yarn such as that made by the Nitivy Company, which is a 75 denier Solvron polyvinyl alcohol yarn, as one of the ground yarns, and, a 75 denier rayon as the other ground yarn, in a knit-float construction.

The finished dampener cover had a width of 4.5 inches, 60 courses per inch and 44 wales per inch. Upon testing, as hereinafter described, the present invention cover had a maximum circumferential shrinkage of 30% and a maximum length shrinkage of 20%.

A sample was taken from this knitted fabric, with the sample having a width of 4.5 inches and a length of 6.0 inches. The width and length of the sample was recorded. All the measurements for the following experiment were taken while the fabric was in a limp state with no outside forces being applied. An experiment was then conducted, whereby the sample was immersed in room temperature tap water for a period of five minutes. After this period the sample was removed and immediately measured. The circumferential shrinkage was recorded as 30% and reduced the width of the sample to 3.15 inches. The length was also measured and recorded at recorded at 5.4 inches or a reduction of 10% from the original length.

In order to compare the prior art fabric to the present fabric a second experiment was conducted using a sample of a prior art fabric. The prior art fabric consisted of polynyvinyl alcohol yarn (Solvron 675 denier PVA Yarn) as the ground yarn and a 150 denier white and 300 denier red Celletex rayon was used as the pile yarn. This sample had a width of 3.75 inches and a length of 6.0 inches. The above measurements, for the experiment, were taken while the fabric was in a limp state with no outside forces being applied. An experiment was then conducted, whereby the sample was immersed in 120° degree Fahrenheit tap water for a period of 5 minutes. After this period the sample was removed and immediately measured. The circumferential shrinkage was recorded as 6.7% and reduced the width of the sample to 3.5 inches. The length was also measured and recorded at recorded at 5.0 inches or a reduction of 16.7% from the original length.

EXAMPLE 2

A second cylindrical fabric was prepared by knitting polyvinyl alcohol yarn such as that made by the Nitivy Company, which is a 75 denier Solvron polyvinyl alcohol yarn, as one of the ground yarns, a 75 denier rayon as another ground yarn, and a third Yarn, a 20 denier nylon, to reinforce and strengthen the fabric, as yet another ground yarn, in a knit-float construction.

The same tests as described in example 1 were conducted with the results being the same.

The aforementioned illustrates the difference between the prior art and the present invention fabrics. These differences are important. The prior art fabric shrinks in the lengthwise direction, therefore needing additional length in the fabric to accommodate this shrinkage, otherwise the fabric may not be long enough to cover the ends of the dampener roll. This extra fabric has to be removed, therefore waste results. Such additional fabric is not needed in the fabric of the present invention. Because of its widthwise shrinkage, it may be accurately measured in the lengthwise direction leaving no waste material.

It is intended that this invention be limited only by the following claims.

What is claimed is:

1. A dampener cover having ground yarns, the improvement comprising:
   ground yarns of a water shrinkable yarn and a hydrophilic yarn, said water shrinkable yarn and said hydrophilic yarn being knit together in the same course of said cover, said cover exhibiting a substantially circumferential shrinkage after immersion in water, and said hydrophilic yarn being drawn close together by said shrinkage so as to substantially form a smooth surface on said cover.

2. The dampener cover of claim 1 wherein said water-shrinkable yarn is a polyvinyl alcohol fiber having shrinkage percentage of between 25% to 40%.

3. The dampener cover of claim 2 wherein said cover undergoes a predominantly circumferential shrinkage after immersion in water, said circumferential shrinkage being at least 15%.

4. A dampener cover having ground yarns, the improvement comprising:
   ground yarns of a water shrinkable yarn, a hydrophilic yarn, and a third yarn having high tensile strength, said water shrinkable yarn, said hydrophilic yarn and said third yarn being knit together in the same course of said cover, said cover exhibiting a substantially circumferential shrinkage after immersion in water, said hydrophilic yarn being drawn close together by said shrinkage so as to form a smooth surface on said cover.

5. The dampener cover of claim 4 wherein said water-shrinkable yarn is a polyvinyl alcohol fiber having shrinkage percentage of between 25% to 40%.

6. The dampener cover of claim 5 wherein said cover undergoes a predominantly circumferential shrinkage after immersion in water, said circumferential shrinkage being at least 15%.

7. The dampener cover of claim 4 wherein the third yarn may be selected from one or more high tensile yarns, for example, nylon.

* * * * *